US007515309B2

United States Patent
Yano et al.

(10) Patent No.: US 7,515,309 B2
(45) Date of Patent: Apr. 7, 2009

(54) RECORDING APPARATUS, COMMUNICATION APPARATUS, RECORDING SYSTEM, AND CONTROL METHOD THEREFOR

(75) Inventors: Kentaro Yano, Kanagawa (JP); Takao Aichi, Tokyo (JP); Akitoshi Yamada, Kanagawa (JP); Kazuya Sakamoto, Kanagawa (JP); Ruriko Mikami, Kanagawa (JP); Fumihiro Goto, Kanagawa (JP); Kazuyuki Masumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 10/763,620

(22) Filed: Jan. 28, 2004

(65) Prior Publication Data

US 2004/0252335 A1 Dec. 16, 2004

(30) Foreign Application Priority Data

| Jan. 31, 2003 | (JP) | ............................. 2003-024544 |
| Jan. 15, 2004 | (JP) | ............................. 2004-008401 |

(51) Int. Cl.
*H04N 1/21* (2006.01)
*H04N 5/225* (2006.01)

(52) U.S. Cl. .................................... 358/302; 348/207.2

(58) Field of Classification Search ............... 358/1.15, 358/1.9, 1.18, 296, 448, 302; 710/5, 8, 65, 710/107; 348/207.2, 207.99; 396/57; 707/100; 455/39; 101/484
See application file for complete search history.

(56) References Cited

U.S. PATENT DOCUMENTS

| 5,541,656 | A | | 7/1996 | Kare et al. | |
|---|---|---|---|---|---|
| 6,000,864 | A | * | 12/1999 | Hanada | ........................ 400/62 |
| 6,055,361 | A | | 4/2000 | Fujita et al. | |
| 6,298,405 | B1 | | 10/2001 | Ito et al. | ...................... 710/107 |
| 6,806,978 | B1 | * | 10/2004 | Tamura et al. | ............. 358/1.15 |
| 7,415,287 | B2 | | 8/2008 | Ueno | ......................... 455/557 |
| 2001/0047443 | A1 | | 11/2001 | Ito et al. | ...................... 710/107 |

(Continued)

FOREIGN PATENT DOCUMENTS

CA 2235567 10/1998

(Continued)

OTHER PUBLICATIONS

International Search Report mailed Apr. 20, 2004 (PCT/JP2004/000804).

(Continued)

*Primary Examiner*—Saeid Ebrahimi Dehkordy
(74) *Attorney, Agent, or Firm*—Fitzpatrick, Cella, Harper & Scinto

(57) ABSTRACT

According to an aspect of the present invention, when a printer which is directly connected to a digital camera via a communication interface and records image data transmitted from the digital camera receives a recording request from the camera, the printer acquires an image data amount to be supplied from the digital camera, and determines whether to be able to receive the whole image data at once and process the image data. In a case where it is determined that the image data is not able to be processed, the printer requests segmented data of the image data stored in the digital camera. The printer receives the segmented data a plurality of number of times, and prints the whole image data.

6 Claims, 16 Drawing Sheets

U.S. PATENT DOCUMENTS

| | | | |
|---|---|---|---|
| 2001/0048534 A1* | 12/2001 | Tanaka et al. | 358/1.16 |
| 2002/0060810 A1 | 5/2002 | Shiraiwa | 358/1.16 |
| 2002/0089688 A1 | 7/2002 | Ferlitsch et al. | |
| 2003/0067620 A1 | 4/2003 | Masumoto et al. | 358/1.13 |
| 2003/0112356 A1* | 6/2003 | No et al. | 348/333.01 |
| 2003/0156196 A1 | 8/2003 | Kato et al. | 348/207.2 |
| 2005/0190265 A1* | 9/2005 | Small | 348/207.2 |

FOREIGN PATENT DOCUMENTS

| | | |
|---|---|---|
| EP | 0 874 519 | 10/1998 |
| EP | 0 938 218 A2 | 8/1999 |
| EP | 1 005 199 A | 5/2000 |
| JP | 2002-19235 | 8/1990 |
| JP | 2002-63129 | 10/1990 |
| JP | 10-229538 | 8/1998 |
| JP | 11-007701 | 1/1999 |
| JP | 2001-290612 | 10/2001 |
| JP | 2002-190877 | 7/2002 |
| JP | 2003-341183 | 12/2003 |
| RU | 2187146 | 9/1998 |

OTHER PUBLICATIONS

International Search Report mailed Apr. 20, 2004 (PCT/JP2004/00856).

European Search Report dated Apr. 22, 2008, in application No. 04706293.0-1245.

White Paper of CIPA DC-001-2003, Digital Photo Solutions for Imaging Devices, Camera & Imaging Products Association, Feb. 3, 2003, pp. 1-5.

Photographic and Imaging Manufacturers Association, Inc., PIMA 15740:2000, Approved Jul. 5, 2000, 1st Edition, "Photography - Electronic Still Picture Imaging - Picture Transport Protocol (PTP) for Digital Still Photography Devices," 2000, pp. 1-147.

Japanese Office Action dated Sep. 26, 2008, in Japanese Application No. 2004-008401.

* cited by examiner

FIG. 7

```
<startJob>
  <jobConfig>
       <quality>50000000</quality>              —— 700
       <paperSize>51060000</paperSize>          —— 701
       <paperType>52020000</paperType>          —— 702
       <fileType>53000000</fileType>            —— 703
720    <datePrint>54010000</datePrint>          —— 704
       <fileNamePrint>55000000</fileNamePrint>  —— 705
       <imageOptimize>56000000</imageOptimize>  —— 706
       <fixedSize>58030000</fixedSize>          —— 707
       <cropping>59000000</cropping>            —— 708
  </jobConfig>
  <printInfo>
       <fileId>00000001</fileId>                —— 709
721    <date>2002/10/28</date>                  —— 710
  </printInfo>
</startJob>
```

FIG. 8A

| prtPID | ImagePath | copyID | progress | Image Printed |
|---|---|---|---|---|

FIG. 8B

| dpsPrint ServiceStatus | jobEnd Reason | error Status | error Reason | disconnect Enable | Capability Changed | newJobOK |
|---|---|---|---|---|---|---|

RECORDING APPARATUS, COMMUNICATION APPARATUS, RECORDING SYSTEM, AND CONTROL METHOD THEREFOR

FIELD OF THE INVENTION

The present invention relates to a recording apparatus which receives image data from an image supply device such as a digital camera and records the image data, a communication apparatus, a recording system, and a control method therefor.

BACKGROUND OF THE INVENTION

In recent years, digital cameras (image sensing devices) which can sense images and convert them into digital image data by simple operations have been prevalent. When an image sensed by such camera is printed and used as a photo, it is a common practice to temporarily download the sensed digital image data from a digital camera to a PC (computer), execute an image process by the PC, and output the processed image data from the PC to a color printer, thus printing an image.

By contrast, for example, a color print system, which allows a digital camera to directly transfer digital image data to a color printer without the intervention of any PC and can print it out, a so called photo direct (PD) printer in which a memory card that is mounted in a digital camera and stores sensed images can be directly mounted in the color printer and sensed images stored in the memory card can be printed, has recently been developed.

Particularly, in order to directly transfer image data from a digital camera to a printer and print the image data, demands have arisen for standardization of interface specifications between a digital camera of each manufacturer and a printer, the operation method, and the like. One proposal for standardization is a guideline for realizing a DPS (Direct Print System).

In recent digital cameras, the resolution of a sensed image becomes higher along with an increase in the resolution of a printer which prints the image and user's demands for obtaining a higher-quality image. As the image resolution increases, the image data amount also abruptly increases. If high-resolution image data is transmitted from the camera to the printer at once, some printers may not save the received data in their memories.

SUMMARY OF THE INVENTION

The present invention has been made in consideration of the above situation, and has as its feature to provide a recording apparatus which acquires image file information prior to reception of image data, determines the data amount of the image data, when the image data cannot be received and processed at once, segments and receives the image data a plurality of number of times, and processes it, a communication apparatus, a recording system, and a control method therefor.

It is another object of the present invention to provide a recording apparatus which, when a thumbnail image is contained because an image supply device sometimes creates and stores in advance a thumbnail image used for an index image, acquires and uses the thumbnail image for index recording, a communication apparatus, a recording system, and a control method therefor.

According to the present invention, there is provided with a recording apparatus which is directly connected to an image supply device via a communication interface, and records image data transmitted from the image supply device, comprising: reception means for receiving a recording request from the image supply device; acquisition means for acquiring an amount of image data to be supplied from the image supply device upon reception of the recording request by the reception means; determination means for determining whether to be able to receive at once the amount of image data acquired by the acquisition means and process the image data; and control means for controlling to receive segmented image data from the image supply device a plurality of number of times in a case where the determination means determines that the image data cannot be processed at once.

Further, according to the present invention, there is provided with a control method in a recording system in which an image supply device and a recording apparatus are directly connected via a communication interface, and image data is transmitted from the image supply device to the recording apparatus and recorded, comprising: a transmission step of transmitting a recording request from the image supply device to the recording apparatus; an acquisition step of acquiring an amount of image data to be supplied from the image supply device in response to the recording request; a determination step of determining whether to be able to receive at once the amount of image data acquired in the acquisition step and process the image data; and a control step of controlling to segment the image data and transmit the segmented image data from the image supply device to the recording apparatus a plurality of number of times, in a case where it is determined the image data is not to able to be processed in the determination step, wherein when the recording apparatus receives the segmented image data a plurality of number of times, the recording apparatus records each segmented image data.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIG. 7 depicts a view for explaining an example of a print start command issued by the DSC according to the embodiment;

FIGS. 8A and 8B depict views for explaining JobStatus and DeviceStatus according to the embodiment;

DESCRIPTION OF THE PREFERRED EMBODIMENTS

Preferred embodiments of the present invention will now be described in detail below with reference to the accompanying drawings.

Figure 1:
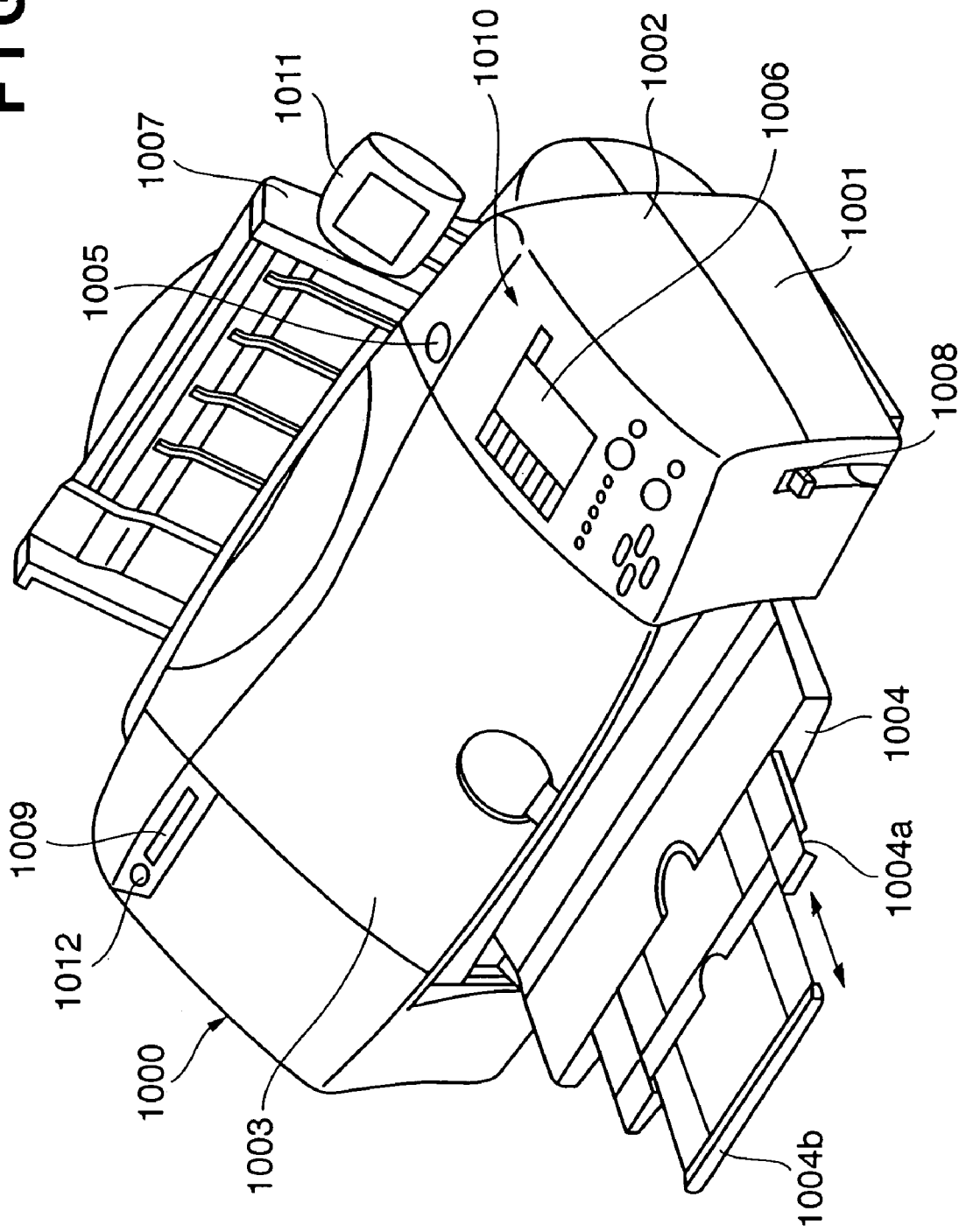
FIG. 1 depicts a schematic perspective view of a PD printer according to an embodiment of the present invention.

FIG. 1 depicts a schematic perspective view of a photo direct printer (to be referred to as a PD printer hereinafter) 1000 according to an embodiment of the present invention. The PD printer 1000 has a function of receiving data from a host computer (PC) and printing the data as a general PC printer, and a function of directly reading and printing image data stored in a storage medium such as a memory card, or receiving image data from a digital camera and printing the data.

Referring to FIG. 1, a main body which forms the housing of the PD printer 1000 according to the embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. These cases are combined to form a hollow structure having a storage space which stores mechanisms (to be described later). Openings are respectively formed in the upper and front surfaces of the main body. One end of the exhaust tray 1004 is rotatably held by the lower case 1001, and rotation of the tray 1004 opens/closes the opening formed in the front surface of the lower case 1001. In executing print operation, the exhaust tray 1004 is rotated toward the front surface side to open the opening. Print sheets can be exhausted from the opening, and sequentially stacked on the exhaust tray 1004. The exhaust tray 1004 stores two auxiliary trays 1004a and 1004b. If necessary, the auxiliary trays can be pulled out to enlarge/reduce the loading area of print sheets in three steps.

One end of the access cover 1003 is rotatably held by the upper case 1002 so as to be able to open/close the opening formed in the upper surface. By opening the access cover 1003, a printhead cartridge (not shown), ink tank (not shown), or the like stored in the main body can be exchanged. Although not shown, when the access cover 1003 is opened/closed, a projection formed on the rear surface of the cover 1003 rotates a cover open/close lever. The open/close state of the access cover 1003 can be detected by detecting the rotation position of the lever by a microswitch or the like.

A power key 1005 is arranged on the upper surface of the upper case 1002. A control panel 1010 which comprises a liquid crystal display unit 1006, various key switches, and the like is provided on the right side of the upper case 1002. The structure of the control panel 1010 will be described in detail later with reference to FIG. 2. Reference numeral 1007 denotes an automatic feeder which automatically feeds a print sheet into the apparatus main body. Reference numeral 1008 denotes a paper gap select lever which is used to adjust the gap between the printhead and a print sheet. Reference numeral 1009 denotes a card slot which receives an adapter capable of receiving a memory card. Image data stored in the memory card can be directly read and printed via this adapter. Examples of the memory card (PC) are a compact flash™ memory card, smart media card, and memory stick. Reference numeral 1011 denotes a viewer (liquid crystal display unit) which is detachable from the main body of the PD printer 1000, and is used to display an image for one frame, index image, or the like when the user wants to search images stored in the PC card for an image to be printed. Reference numeral 1012 denotes a USB terminal which is used to connect a digital camera (to be described later). Also, another USB connector for connecting a personal computer (PC) is provided on the rear surface of the PD printer 1000.

Figure 2:
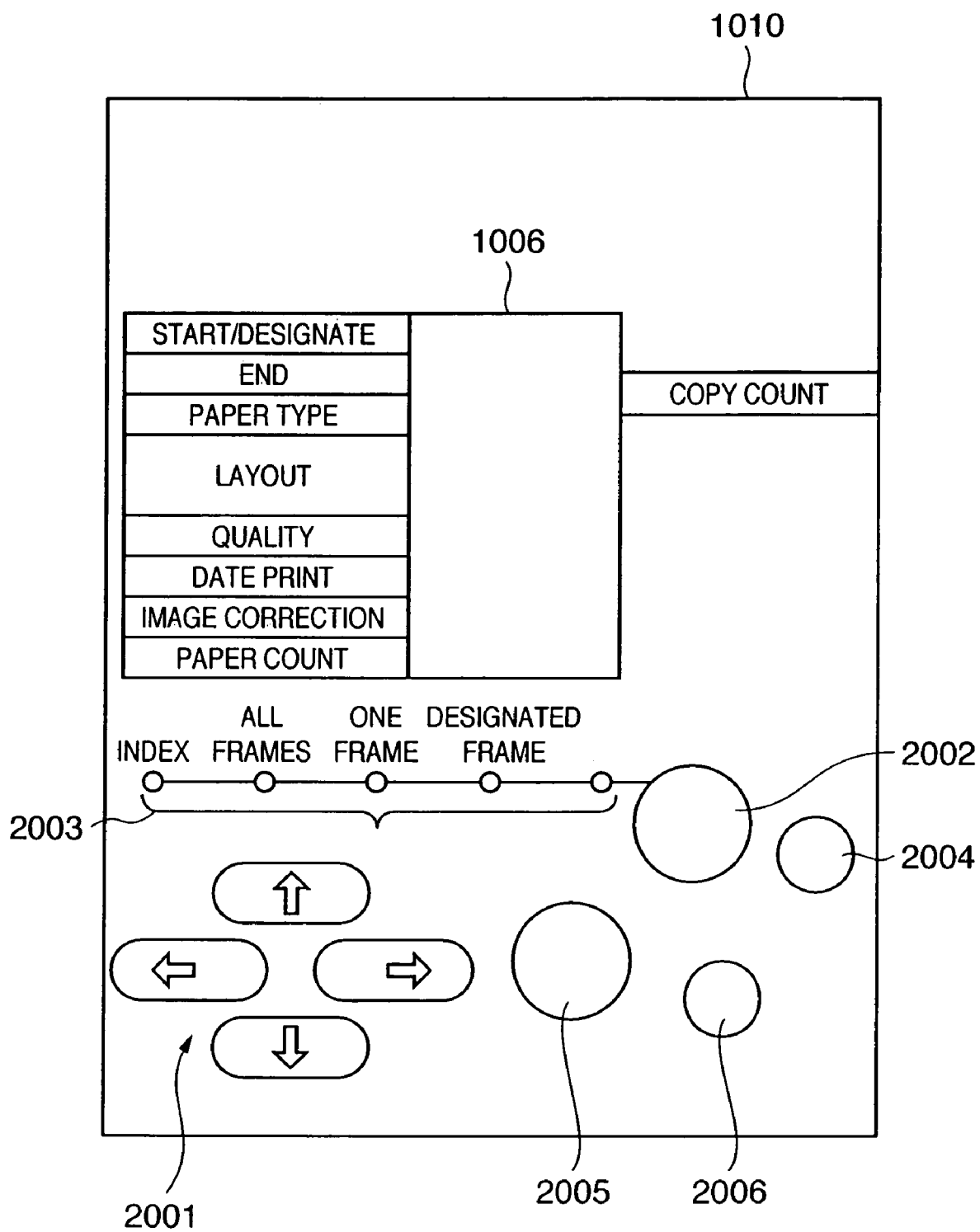
FIG. 2 depicts a schematic view of the control panel of the PD printer according to the embodiment.

FIG. 2 depicts a schematic view of the control panel 1010 of the PD printer 1000 according to the embodiment.

Referring to FIG. 2, the liquid crystal display unit 1006 displays menu items for various setups of data associated with items printed on the right and left sides of the unit 1006. The items displayed in the liquid crystal display unit 1006 include, e.g., the first number or designated frame number of a photo to be printed (start/designate), the final photo number subjected to printing end operation (end), the number of copies to be printed (copy count), the type of paper sheet (print sheet) used for printing (paper type), the setup of the number of photos to be printed on one paper sheet (layout), a designation of print quality (quality), a designation as to whether or not to print a photographing date (date print), a designation as to whether or not to print a photo after correction (image correction), a display of the number of paper sheets required for printing (paper count), and the like. These items are selected or designated using cursor keys 2001 by a user. Reference numeral 2002 denotes a mode key. Every time the mode key 2002 is pressed, the type of printing (index printing, all frame printing, one frame printing, and the like) can be switched, and a corresponding one of LEDs 2003 is turned on in accordance with the selected type of printing. Reference numeral 2004 denotes a maintenance key which is used to perform maintenance of the printer such as cleaning of the printhead. Reference numeral 2005 denotes a print start key which is pressed when the start of printing is designated or when the maintenance setup is settled. Reference numeral 2006 denotes a print cancel key which is pressed when printing or maintenance is canceled.

Figure 3:
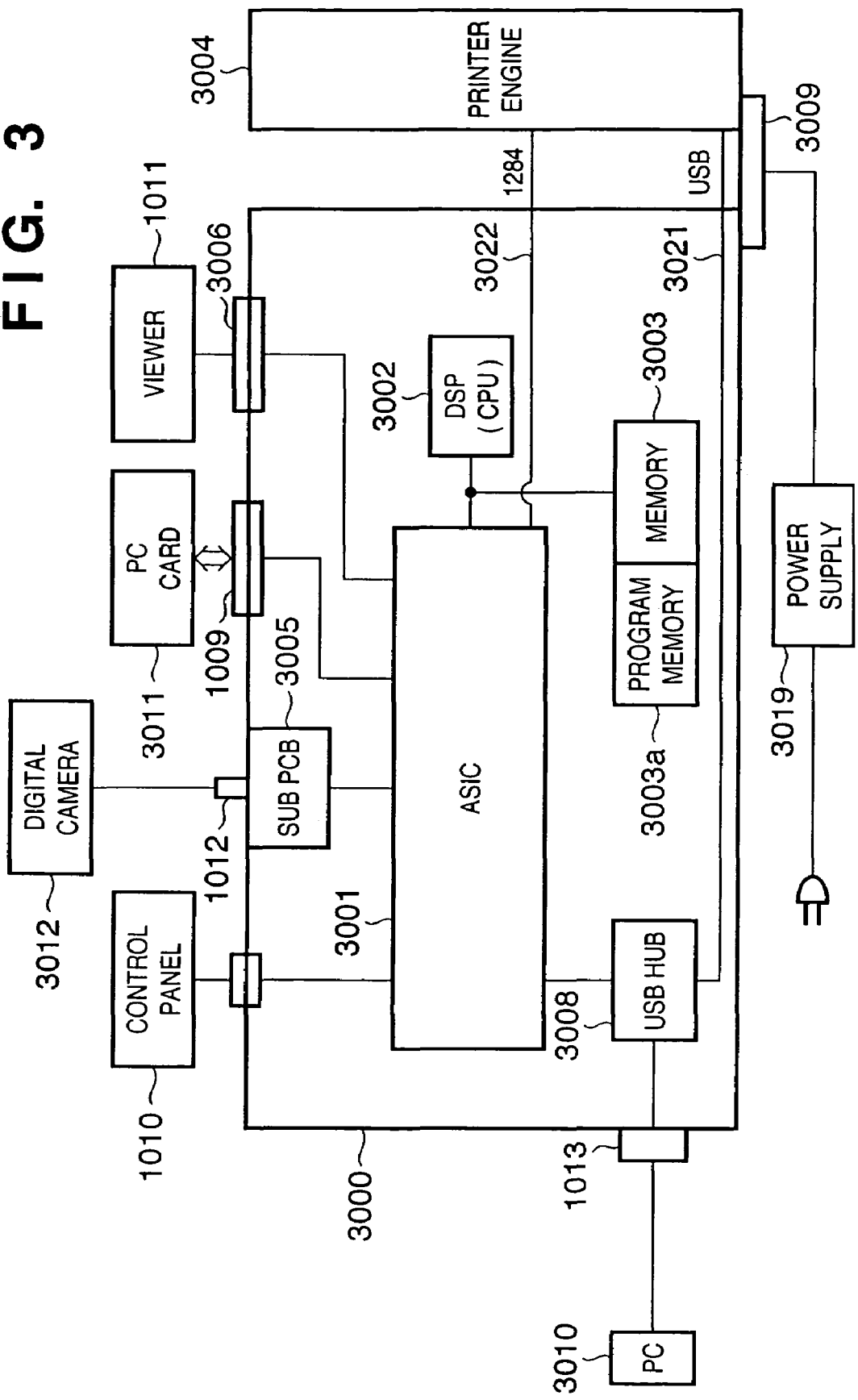
FIG. 3 is a block diagram showing the arrangement of principal part associated with control of the PD printer according to the embodiment.

The arrangement of principal part associated with control of the PD printer 1000 according to the embodiment will be described below with reference to FIG. 3. In FIG. 3, the same reference numerals denote parts common to those in the above drawings, and a description thereof will be omitted.

Referring to FIG. 3, reference numeral 3000 denotes a controller (control board). Reference numeral 3001 denotes an ASIC (dedicated custom LSI). Reference numeral 3002 denotes a DSP (Digital Signal Processor) which incorporates a CPU and executes various control processes (to be described later), and image processes such as conversion from a luminance signal (RGB) into a density signal (CMYK), scaling, gamma conversion, and error diffusion. Reference numeral 3003 denotes a memory having a program memory 3003a which stores a control program for the CPU of the DSP 3002, a RAM area has a memory area functioning as a work area which stores image data and the like. Reference numeral 3004 denotes a printer engine. In the embodiment, the printer is equipped with a printer engine for an ink-jet printer which prints a color image by using a plurality of color inks. Reference numeral 3005 denotes a USB connector serving as a port for connecting a digital camera (DSC) 3012. Reference numeral 3006 denotes a connector for connecting the viewer 1011. Reference numeral 3008 denotes a USB hub (USB HUB). When the PD printer 1000 executes printing on the basis of image data from a PC 3010, the USB hub 3008 allows data from the PC 3010 to pass through it, and outputs the data to the printer engine 3004 via a USB 3021. The connected PC 3010 can directly exchange data and signals with the printer engine 3004 and execute printing (functions as a general PC printer). Reference numeral 3009 denotes a power supply connector which inputs a DC voltage converted from commercial AC power from a power supply 3019. The PC 3010 is a general personal computer. Reference numeral 3011 denotes a memory card (PC card) mentioned above; and numeral 3012 denotes the digital camera (to be also referred to as a DSC: Digital Still Camera).

Note that signals are exchanged between the controller 3000 and the printer engine 3004 via the USB 3021 or an IEEE1284 bus 3022.

Figure 4:
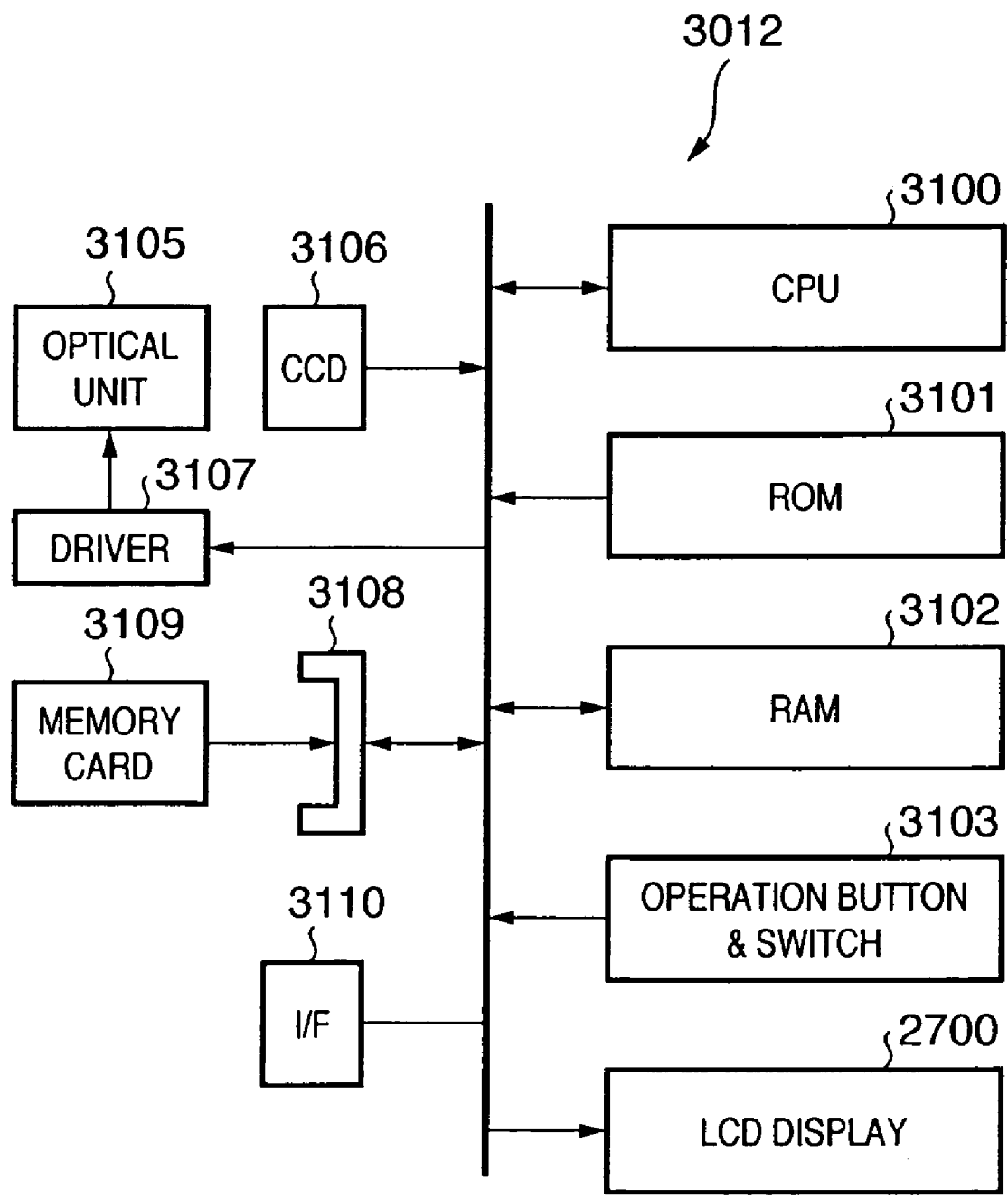
FIG. 4 is a block diagram showing the arrangement of a DSC according to the embodiment.

FIG. 4 is a block diagram showing the arrangement of the DSC (Digital Still Camera) 3012.

Referring to FIG. 4, reference numeral 3100 denotes a CPU which controls the overall DSC 3012; and numeral 3101 denotes a ROM which stores the process sequence (control program) of the CPU 3100. Reference numeral 3102 denotes a RAM which is used as a work area for the CPU 3100; and numeral 3103 denotes a switch group which is used to perform various operations. The switch group 3103 includes various switches, cursor keys, and the like. Reference numeral 2700 denotes a liquid crystal display unit which is used to display an image photographed at present or a sensed/stored image and display a menu for performing various setups to the DSC 3012. Reference numeral 3105 denotes an optical unit which mainly comprises a lens and its drive system. Reference numeral 3106 denotes a CCD element; and numeral 3107 denotes a driver which drives and controls the optical unit 3105 under the control of the CPU 3100. Reference numeral 3108 denotes a connector for connecting a storage medium 3109 (compact flash™ memory card, smart media card, or the like); and numeral 3110 denotes a USB interface (USB slave side) for connecting a PC or the PD printer 1000 of the embodiment.

Figure 5:
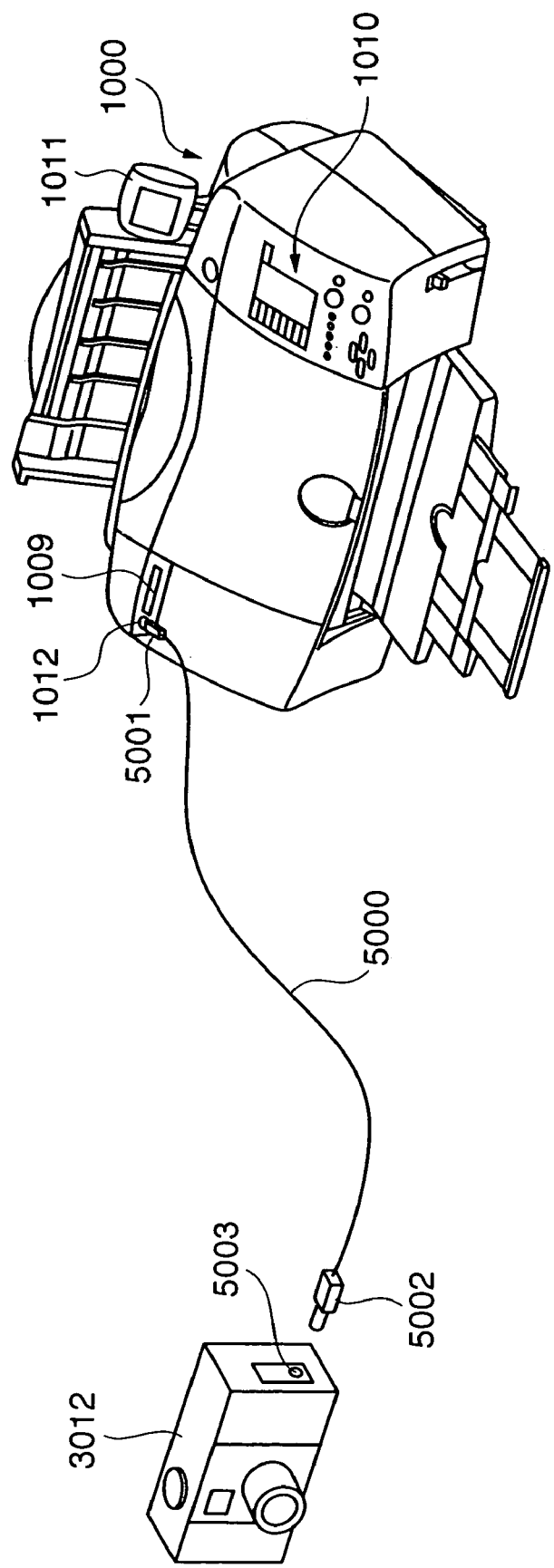
FIG. 5 depicts a view for explaining connection between the PD printer and a digital camera according to the embodiment.

FIG. 5 depicts a view for explaining connection between the PD printer 1000 and the DSC 3012 according to the embodiment. The same reference numerals denote parts common to those in the above drawings, and a description thereof will be omitted.

Referring to FIG. 5, a cable 5000 comprises a connector 5001 which is connected to the connector 1012 of the PD printer 1000, and a connector 5002 for connecting a connector 5003 of the digital camera 3012. The digital camera 3012 can output image data saved in an internal memory (memory card) via the connector 5003. The digital camera 3012 can take various arrangements such as an arrangement which incorporates a memory as a storage means and an arrangement having a slot for inserting a removal memory. The PD printer 1000 and digital camera 3012 are connected via the cable 5000 shown in FIG. 5, and image data from the digital camera 3012 can be directly sent to the PD printer 100 and printed by the PD printer 1000.

Operation examples of the print system according to the embodiment on the basis of the above arrangement will be explained as embodiments.

First Embodiment

The outline of the operation of a print system including a DSC 3012 and PD printer 1000 based on the above arrangement will be described. In the print system according to the first embodiment, the DSC 3012 and PD printer 1000 can operate in accordance with DPS (Direct Print System) specifications.

Figure 6:
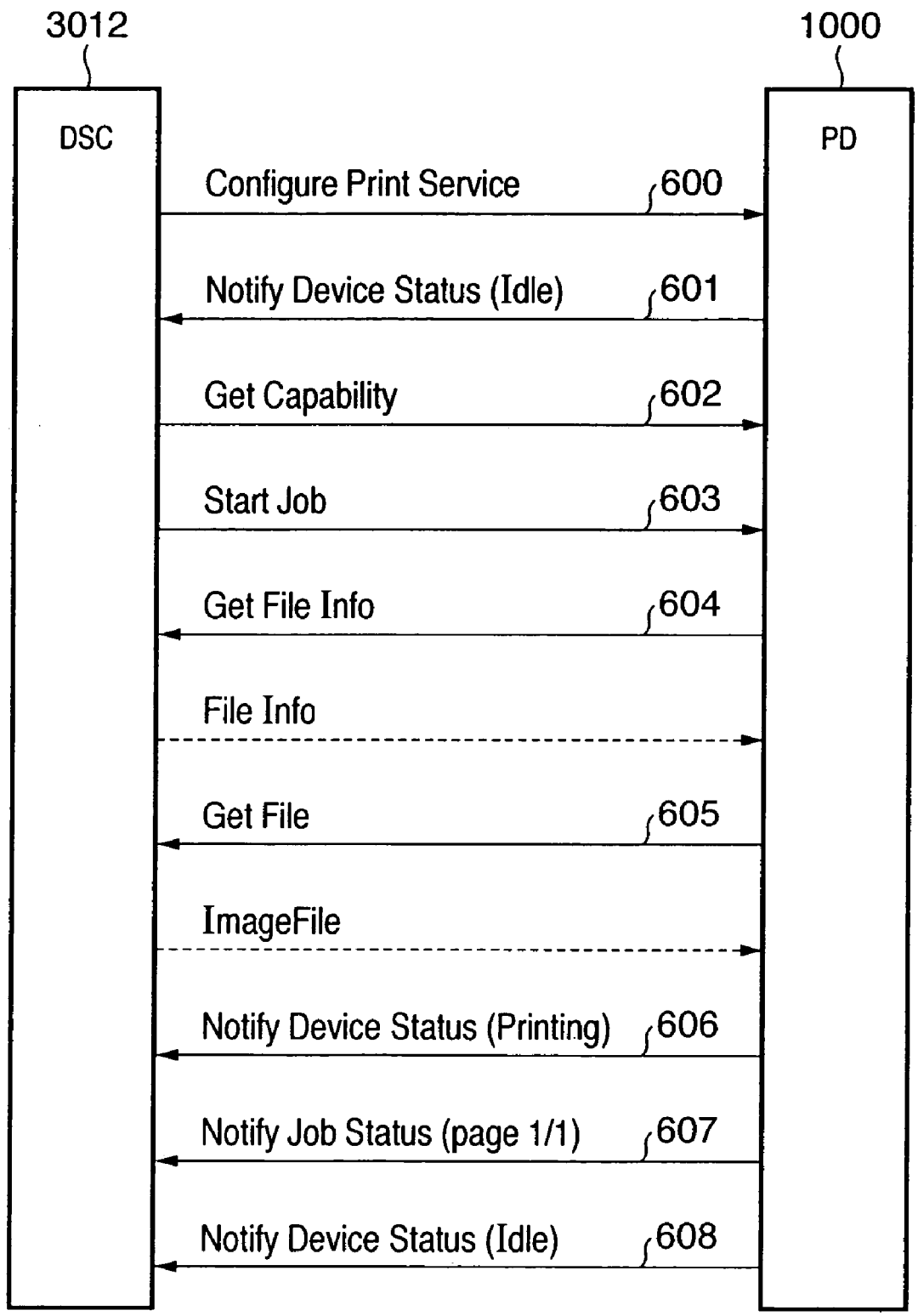
FIG. 6 depicts a chart for explaining command exchange between the PD printer and the DSC in a print system according to the embodiment.

FIG. 6 depicts a chart for explaining a sequence when the DSC 3012 issues a print request to the PD printer 1000 to print in the print system according to the first embodiment.

This process sequence is executed when the PD printer 1000 and the DSC 3012 are connected via a cable 5000 and have confirmed that they comply with the DPS specifications. The DSC 3012 transmits "ConfigurePrintService" to the PD printer 1000 to acquire the state of the PD printer 1000 (600). In response to this, the PD printer 1000 notifies the DSC 3012 of the current state (in this case, "idle" state) of the PD printer 1000 (601). The DSC 3012 inquires the capability of the PD printer 1000 (602), and issues a print start request (StartJob) corresponding to the capability (603). The print start request is issued on condition that "newJobOK" (FIG. 8B) in the status information (to be described later) from the PD printer 1000 is "True" in 601.

In response to the print start request, the PD printer 1000 requests file information of the DSC 3012 on the basis of the file ID of image data to be printed (604). In response to this, the DSC 3012 transmits file information. The file information contains items of information such as the file capacity (file size), presence/absence of a thumbnail image, and file attributes. When the PD printer 1000 receives the file information and determines that the file can be processed, the PD printer 1000 requests the file of the DSC 3012 (605). The DSC 3012 sends image data of the requested file to the DSC 3012. After then, when the PD printer 1000 starts a print process, the PD printer 1000 sends status information representing "Printing" to the DSC 3012 by "NotifyDeviceStatus" in 606. After a print process of one page ends, the PD printer 1000 notifies the DSC 3012 of the end of the print process by "NotifyJobStatus" 607 at the start of processing the next page. For print of only one page, the PD printer 1000 notifies the DSC 3012 of the "idle" state by "NotifyDviceStatus" 608 at the end of printing one requested page. For N-up print of laying out a plurality of (N) images on one page and printing them, the PD printer 1000 sends "NotifyJobStatus" 607 to the DSC 3012 every time N images are printed. The issuing timings of "NotifyJobStatus" and "NotifyDeviceStatus" and the image data acquisition order in the first embodiment are merely examples, and various cases are conceivable depending on the product specification.

The print process includes a case in which the file IDs of image data to be printed are contained and transmitted at once in a print start request (StartJob) from the DSC 3012 to perform print, and a case in which only the file ID of a DPOF file used in general photo development is contained in a print start request (StartJob) from the DSC 3012 and transmitted to the PD printer 1000, and the PD printer 1000 interprets the DPOF file, acquires the file ID of necessary image data, and prints.

FIG. 7 depicts a view for explaining an example of a print start request issued by the DSC 3012 to the PD printer 1000.

In FIG. 7, numeral 720 denotes the configuration (jobConfig) of the print job, and numeral 721 denotes print information (printInfo).

The configuration 720 will be explained. Numeral 700 (quality) designates the print quality such as "normal" or "high quality". Numeral 701 (paperSize) designates the paper size, and numeral 702 (paperType) designates the paper type such as "plain paper", "photo paper", or "ink-jet paper". Numeral 703 (fileType) designates the type of an image file to be printed, and when, for example, DPOF is used, the type representing DPOF is designated by the file type 703. Numeral 704 (dateprint) designates whether or not to print a date, numeral 705 (fileNamePrint) designates whether or not to print a file name, numeral 706 (imageOptimize) designates whether or not to optimize an image, numeral 707 (fixedSize) designates whether or not to perform fixed-size print, and numeral 708 (cropping) designates whether or not to print a designated range of an image.

The print information 721 contains a file ID 709 (fileid) and date information 710 (date).

FIGS. 8A and 8B depict views for explaining items of information contained in JobStatus and DeviceStatus described above. JobStatus (FIG. 8A) and DeviceStatus (FIG. 8B) are transmitted from the PD printer 1000 to the DSC 3012. The DSC 3012 can request the PD printer 1000 to transmit these items of information at an arbitrary timing.

In FIG. 8A, "prtPID", "ImagePath", and "copyID" become effective when print of a DPOF file is designated. A "prtPID" is identification information (ID) of a print section designated by a DPOF file. An "ImagePath" is information of a path for specifying an image file designated by the DPOF file. A "copyID" designates the number of a copy during print upon designating print of a plurality of copies. In print based on a DPOF file, the DSC 3012 describes "fileID" of the DPOF file in a print start request (StartJob), and transmits the print start request to the PD printer 1000. In response to this, the PD printer 1000 can start printing the DPOF file. The PD printer 1000 acquires the DPOF file on the basis of "fileID" of the DPOF file, executes "GetFileID", and specifies "fileID" of an image file designated in the DPOF file. The PD printer 1000 requests the image file of the DSC 3012, and acquires the image data. As a result, an image designated in the DPOF file can be printed. During execution of print based on the DPOF file, the PD printer 1000 notifies the DSC 3012 by "NotifyJobStatus" of "prtPID", "ImagePath", and "copyID" representing the progress of printing.

When the print process restarts after interruption due to any reason during print of the DPOF file, the print process restarts from a top of the page at which the print process was aborted.

A "progress" represents the current page (N/T) during print out of a prospective number of pages. N represents the current print page, and T represents the total number of print pages to be printed. An "imagePrinted" represents the number of printed images.

A DeviceStatus (FIG. 8B) will be explained.

A "dpsPrintServiceStatus" designates the state of the PD printer 1000, and is transmitted to the DSC 3012 from the PD printer 1000. A "dpsPrintServiceStatus"includes idle, print, and pause states. A "jobEndReason" designates the end state of a print process, and is transmitted to the DSC 3012 upon the completion of printing the final page. An "errorStatus" represents an error state, and is transmitted upon generation of an error. An "errorReason" means a cause of generation the error, and is transmitted together with "errorStatus".

A "disconnectEnable" means that printing is possible even if the USB cable 5000 is disconnected from the PD printer 1000. The PD printer 1000 notifies the DSC 3012 of "disconnectEnable". A "capabilityChanged" means that the capability in the PD printer 1000 has been changed, and is transmitted to the DSC 3012. A "newJobOK" means that the PD printer 1000 can accept a print request, and is transmitted to the DSC 3012.

Figure 9:
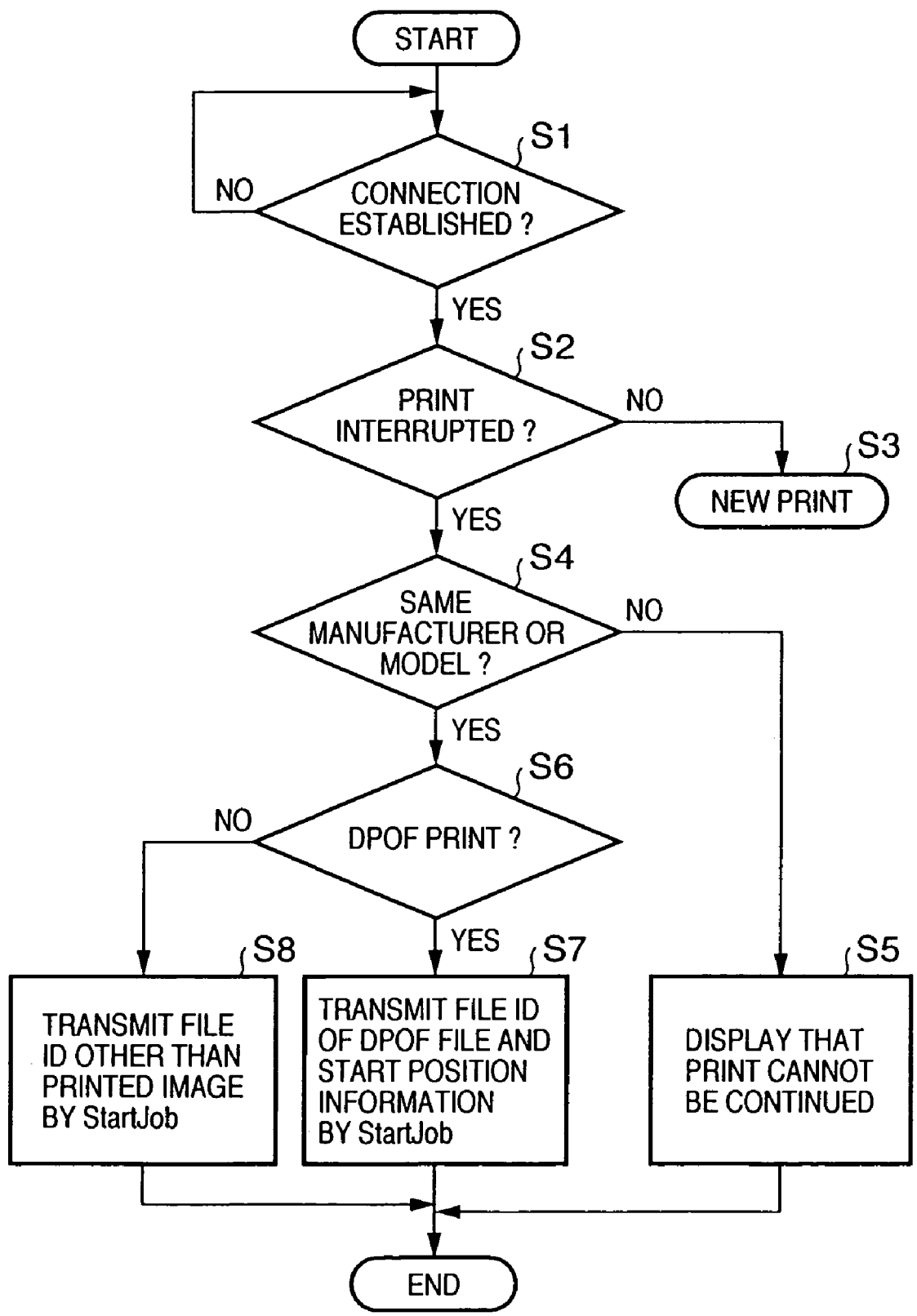
FIG. 9 is a flow chart showing a print restart process by a DSC according to the first embodiment.

FIG. 9 is a flow chart showing a print restart process in the DSC 3012 according to the first embodiment. A program which executes this process is stored in a ROM 3101, and a CPU 3100 executes a control process in accordance with the program to realize the process.

In this process, a print operation is aborted when, e.g., the cable 5000 is disconnected during execution of a print job. After that, the DPS reconnection is established, the print button of the DSC 3012 is designated, and the PD printer 1000 is instructed to restart print operation. The PD printer 1000 then restarts print.

This process assumes that interruption of a print process in the PD printer 1000 and interruption of a print process in the DSC 3012 are recognized by the PD printer 1000 and the DSC 3012.

In step S1, it is determined whether the DSC 3012 and the PD printer 1000 have physically been connected by connecting the cable 5000 or the like and the DPS reconnection has been established. If the connection is established, the process advances to step S2. If the DSC 3012 designates the restart of printing, it is determined whether the print process has been interrupted. If the print process has not interrupted, the process advances to step S3 to perform a normal print process such as a process of newly starting a print process in accordance with a print instruction.

If the print process has been interrupted, the process advances to step S4. It is determined whether the PD printer 1000, which has a newly established connection, is of the same model (same <dpsVersion>and <productName>), the model of the same manufacturer (<productName>), or the model of the same vendor (<vendorName>) as that of the PD printer 1000 which has interrupted the previous print process. In this procedure, the model of the PD printer 1000 is determined on the basis of contents sent as a response from the PD printer 1000 for "ConfigurePrintService" issued by the DSC 3012. When the same PD printer is reconnected, no problem occurs. Even for a printer of another model, if the manufacturer or vendor of the printer is the same and a re-print process according to the first embodiment is possible on the basis of the design of the manufacturer or vendor, restart of printing can be determined to be possible, and the process advances to a subsequent process S6. If NO in step S4, the process advances to step S5 to determine that continuation of the printing process is impossible, and display a message on the display unit 2700 of the DSC 3012. If necessary, the UI (user menu window) displayed on the display unit 2700 may be changed.

If the reconnected apparatus is determined in step S4 to be of a compatible model, the process advances to step S6 to determine whether a printing process is performed using a DPOF file. If YES in step S6, the process advances to step S7 to transmit the file ID of the DPOF file to the PD printer 1000. In this case, "prtPID", "ImagePath", and "copyID" described above are transmitted together with the file ID of the DPOF file, thereby designating a file subjected to the restart of the printing process using the DPOF file.

If the print process is not performed using DPOF file in step S6, i.e., each image file is to be designated and printed, the file IDs of image files except printed image files among the file IDs of image files to be printed are transmitted at once to the PD printer 1000 to execute printing. Note, as a print restart instruction, a print button is designated among the operation buttons of the DSC 3012 to send "StartJob" from the DSC 3012 to the PD printer 1000 and the printing process is restarted.

The PD printer 1000 notifies the DSC 3012 of the end of printing each page by "jobStatus" (meaning the start of printing the next page) sent from the PD printer 1000 at the start of the next page, or "jobEndReason" contained in "deviceStatus" for the final page. The DSC 3012 can, therefore, confirm the number of printed images. Whether the printing process has been interrupted can be determined based on whether the number of images designated by a print instruction have been printed when images are printed one by one, or from the progress ("prtPID", "ImagePath", and "copyID") in a DPOF file or whether the printing process has been completed when the printing process is based on the DPOF file.

When one image is printed on one page, the number of print paper sheets coincides with the number of images. When, however, a plurality of (N) images are laid out and printed on one paper sheet, the number of images to be printed does not coincide with the number of print paper sheets. The DSC 3012 must make the number of print paper sheets and the number of image data match with each other in accordance with the print mode.

Second Embodiment

When date print <dateprint>704 in <jobConfig> 720 in FIG. 7 is designated, <date> 710 contained in <printInfo> 721 is printed. When date print <datePrint> 704 in <jobConfig> 720 is not designated, date data is ignored and is not printed even if <date> 710 is contained in <printInfo> 721.

This can increase the degree of freedom of data contained in <printInfo> 721. A startJob command can be created by, .e.g., directly pasting, to <printInfo> 721, image data and a date list which are used by another job.

Third Embodiment

Figure 10:
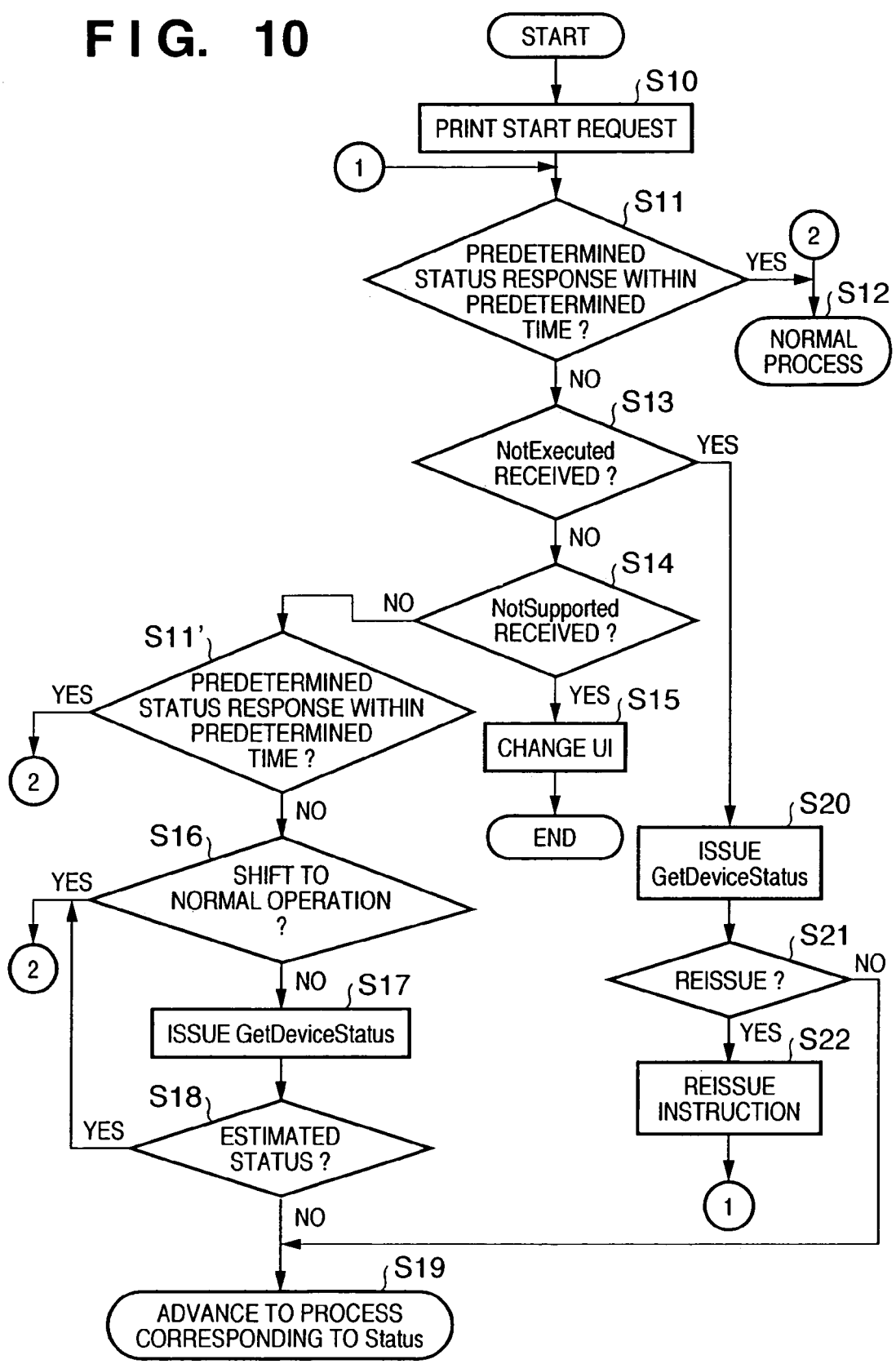
FIG. 10 is a flow chart for explaining a process by a DSC according to the third embodiment.

FIG. 10 is a flow chart for explaining a process in a print system according to the third embodiment of the present invention.

In the third embodiment, when the DSC 3012 issues any command to the PD printer 1000 and the status of the PD printer 1000 changes, the PD printer 1000 notifies the DSC 3012 of the status by "NotifyDeviceStatus" described above. However, when the state of the PD printer 1000 does not change or a response delays, the DSC 3012 determines (estimates) that a prospective status change has occurred in the PD printer 1000 by a previously issued command, and executes a corresponding process. To confirm the state of the PD printer 1000, the DSC 3012 issues "GetDeviceStatus" to the PD printer 1000, acquires the state of the PD printer 1000, and executes a process corresponding to the acquired status of the printer.

An example of this process will be explained with reference to the flow chart of FIG. 10.

In step S10, a print start request "StartJob" is issued to the PD printer 1000. The process advances to step S11 to determine whether a predetermined status response "NotifyDeviceStatus" is received from the PD printer 1000. If the PD printer 1000 is a product-type capable of accepting only one print job, newJobOK of NotifyDeviceStatus indicating that the PD printer 1000 can accept the next print job should represent "False" after issuing the print start request "start-Job" to the PD printer 1000. If a normal response (newJobOK is "False") is received in step S11, the process advances to step S12 to wait until "newJobOK" changes to "True". Thereafter, a normal print process of issuing the next command or outputting image data or the like in accordance with a request from the PD printer 1000 is executed.

In step S13, it is determined whether "NotExecuted" representing that "StartJob" could not be executed has been received. If "NotExecuted" has been received, the process advances to step S20 to issue "GetDeviceStatus" to the PD printer 1000 and acquire the current status of the PD printer 1000. If this status reveals the reason why the instruction could not be executed, and "StartJob" can be reissued, a message to this effect is displayed on the UI of the display unit 2700 of the DSC 3012. After then, if the user designates reissuing of an instruction by using the button 3103, the process advances from step S21 to S22 to reissue to the PD printer 1000 the "StartJob"instruction which has not been executed. If no reissuing designation is input in step S21, the process advances from step S21 to step S19.

If no "NotExecuted" has been received in step S13, the process advances to step S14 to determine whether "NotSupported" has been received. If "NotSupported" has been received, the process advances to step S15. In this case, the previously issued "StartJob" is not supported by the PD printer 1000, and, for example, non-supported items (impossible designation) are displayed on the UI of the display unit 2700 so as to represent that the print instruction is not supported by the PD printer 1000.

The meaning of not supporting the "StartJob" instruction includes a case in which the PD printer 1000 does not support the "StartJob" instruction itself, and also a case in which the PD printer 1000 supports the "StartJob" instruction itself but does not support the currently issued "StartJob" instruction because an unsupported paper size or paper type is designated. In this case, the UI of the DSC 3012 is so reconstructed as to disable selection of an improper paper size or paper type (items to be set for print operation), similar to the above-described example. This can decrease the possibility of receiving "NotSupported" again when a "StartJob" instruction is executed again to the PD printer 1000. Note, upon receiving the "NotSupported", a process of, e.g., confirming a paper size or paper type supported by the PD printer 1000 may be performed.

If no "NotSupported" has been received in step S14, the process advances to step S11'. This step assumes that the response content is substantially "OK". If a predetermined status response is received in step S11', the process advances to step S12 to continue a normal operation. If no predetermined status information is received in step S11', the process advances to step S16 to determine whether to continue the operation as normal operation. This may be displayed using the above-mentioned UI to allow the user to select the normal operation. If the process shifts to the normal operation, the process advances to step S12. If the user does not input any instruction and the process does not shift to the normal operation, the process advances to step S17 to request the status of the PD printer 1000 by using "GetDeviceStatus". The process advances to step S18, and the status of the PD printer 1000 is acquired and if the status is an ordinary one, this status is determined to be a normally estimated one, and the process advances to step S12. If another status is acquired, the process advances to step S19 to execute a process corresponding to the acquired status.

The reason why unestimated "NotExecuted" has been sent back as a response in step S13 is that, for example, a PC 3010 is connected to the PD printer 1000, a print instruction from the PC 3010 is received by the PD printer 1000 at almost the same time as a print start request from the DSC 3012 and a print process of print data from the PC 3010 is commenced. That is, since the DSC 3012 recognizes "newJobOK"="True" in advance on the basis of NotifyDeviceStatus issued by the PD printer 1000, the DSC 3012 issues a "StartJob"command. However, immediately when the "StartJob"command is issued, "newJobOK"="False" is set, and the PD printer 1000 sends back "NotExecuted" as a response. The DSC 3012 which has recognized "newJobOK"="True"receives the unestimated response "NotExecuted" from the PD printer 1000. The reason why no predetermined status information has been received in step S11 is that, for example, the PD printer 1000 is a product capable of accepting a plurality of print jobs and even after a print request "StartJob" is accepted, "newJobOK" of "DeviceStatus" is kept unchanged as "True", and thus the PD printer 1000 does not issue "NotifyDeviceStatus" to the DSC 3012. Also in this case, the DSC 3012 securely operates on the assumption that "newJobOK" is "False" until the state of the PD printer 1000 has been confirmed by "GetDeviceStatus"(because of the possibility of delaying issuing of "NotifyDeviceStatus" representing "newJobOK"="False" due to any cause).

The above description assumes that, even when a command from the DSC 3012 and a command from the PD printer 1000 are almost simultaneously issued, both the commands become effective. However, there may be also a direct print specification: "of almost simultaneously issued commands, a command from the DSC 3012 is preferentially processed, and issuing of a command from the PD printer 1000 is ignored and discarded". In this case, the check content in step S11 is "whether a command issued from the PD printer 1000 has been received?". If YES in step S11, the process advances to step S13 via a step (not shown) of ignoring a command from the PD printer 1000; if no command is received from the printer 1000, the process directly advances to step S13.

In the above direct print specification, the discarded command of the PD printer 1000 may be reissued by the PD printer 1000. A case in which a print instruction from the PC 3010 is received at almost the same time as "StartJob" from the DSC 3012 and a print process for print data from the PC 3010 is commenced will be exemplified. The DSC 3012 which has recognized in advance "newJobOK"="True" by NotifyDeviceStatus issued by the PD printer 1000 in advance issues a "StartJob" instruction. At almost the same time, the PD printer 1000 which starts a print process for print data from the PC 3010 changes to "newJobOK"="False". In order to notify the DSC 3012 of this, the PD printer 1000 issues a "NotifyDeviceStatus" instruction to the DSC 3012. However, the "NotifyDeviceStatus" instruction issued by the PD printer 1000 is discarded, and the "StartJob" instruction issued by the DSC 3012 is preferentially processed. Since the PD printer 1000 has already changed "newJobOK" to "False", it sends back "NotExecuted" in response to the "StartJob" instruction. At this time, the PD printer 1000 must reissue the "NotifyDeviceStatus" instruction in order to notify the DSC 3012 of "newJobOK"="False". At this time, if the DSC 3012 issues the next command, instructions (commands) are almost simultaneously issued from the two devices again.

Basically, the situation in which the two devices almost simultaneously issue commands and one of them is discarded may occur when criterion statuses used to issue commands from the two devices are different. In this case, the direct print process becomes very unstable and is in a dangerous state. Hence, the situation in which the two devices almost simultaneously issue commands is preferably avoided as much as possible. For this purpose, for example, when the DSC 3012 detects "issuing of a command from the PD printer 1000" in step S11, issuing of a "GetDeviceStatus" instruction may be inhibited in step S20 or S17 for a predetermined time period to wait for a command from the PD printer 1000.

Also in the PD printer 1000 as a partner of the direct print, inhibition of issuing a command from the PD printer 1000 for a predetermined time period and a wait for a command from the DSC 3012 may be set. If, however, these predetermined inhibition time periods are equal, commands will be almost simultaneously issued from the two devices after the elapse of the predetermined time period. Considering this possibility, the predetermined time period may not be fixed and may be changed dynamically discontinuously or irregularly. Alternatively, the inhibition time period used when "issuing of a command by the PD printer 1000 is not detected" in step S11 may be used until "issuing of a command by the PD printer 1000 is detected" in step S11, and updated when "issuing of a command by the PD printer 1000 is detected" in step S11. As a method of changing the timing of issuing command, the issuing timing may be advanced. To prevent the two devices from changing to the same timing, the timing may be changed by a predetermined rule. For example, the timing change method may be set depending on the USB host or slave. Alternatively, both the DSC 3012 and PD printer 1000 may comprise means for generating random timing signals, and command issuing timings may be determined in accordance with the timing signals, respectively. As described above, the PD printer 1000 may also be set to a state in which issuing of a command from the PD printer 1000 is inhibited for a predetermined time period, thereby decreasing the possibility of almost simultaneously issuing commands from the two devices. Various modifications described above can also be applied.

Fourth Embodiment

A process of continuing print from the DSC 3012 in the print system according to the fourth embodiment and a process of interrupting print process will be described. Also in this case, the arrangement of the print system and those of the DSC 3012 and a PD printer 1000 are the same as those described above, and a description thereof will be omitted.

Figure 11:
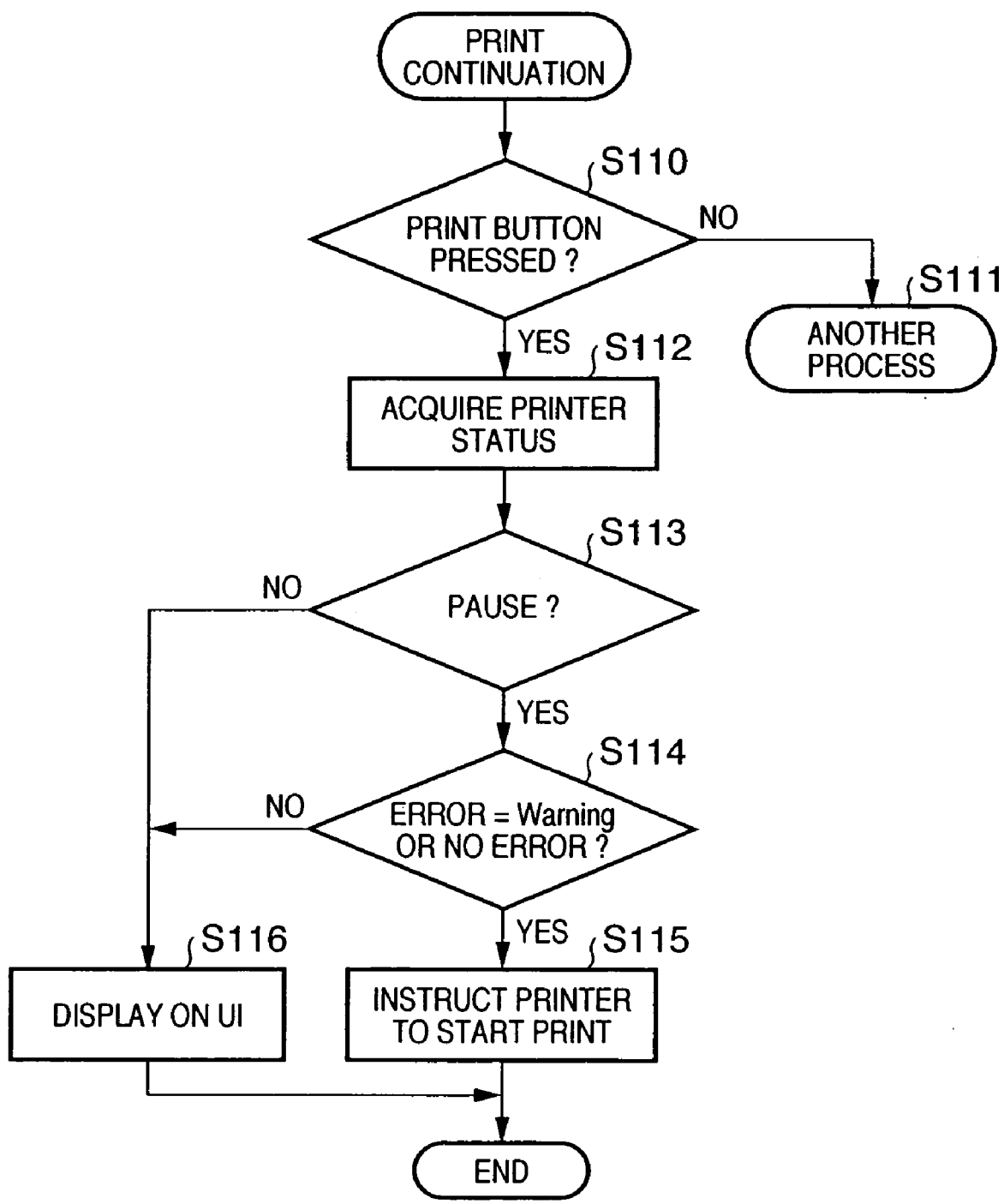
FIG. 11 is a flow chart for explaining a process accompanying button operation for continuing printing in a DSC according to the fourth embodiment.

FIG. 11 is a flow chart for explaining a print continuation process executed when a print process in the DSC 3012 according to the fourth embodiment is interrupted and then executed upon designating a print button which designates the print start.

In step S110, it is determined whether the print button among operation buttons 3103 of the DSC 3012 has been designated. If NO in step S110, the process advances to step S111 to execute another process such as a process corresponding to a designated button or a wait for an instruction with a button. If the print button has been designated, the process advances to step S112. A "GetDeviceStatus" is issued to the PD printer 1000 to request status information of the PD printer 1000 and acquire status information sent from the PD printer 1000 in response to the request. The process advances to step S113 to determine on the basis of the acquired status information whether the status of the PD printer 1000 is "pause". If YES in step S113, the process advances to step S114 to determine whether an error has occurred and "Warning" is set (e.g., a cable is disconnected), or no error has occurred. If YES in step S114, the restart of a print process is determined to be possible (because the status from the PD printer 1000 has been received). The process advances to step S115 to instruct the PD printer 1000 to restart the print process (transmit "ContinueJob").

If no pause state is set in step S113 or another error has occurred in step S114, the restart of print process is determined to be impossible, and a message to this effect is displayed on the UI of the display unit 2700. In this case, for example, a message is displayed on the display unit 2700 to notify the user that print process cannot restart, and/or selection of the print button is disabled. Wasteful press of the print button by the user can be avoided by acquiring the statue of the PD printer 1000 before press of the print button is determined in step S110, and notifying the user whether ON/OFF of the print button is effective.

Figure 12:
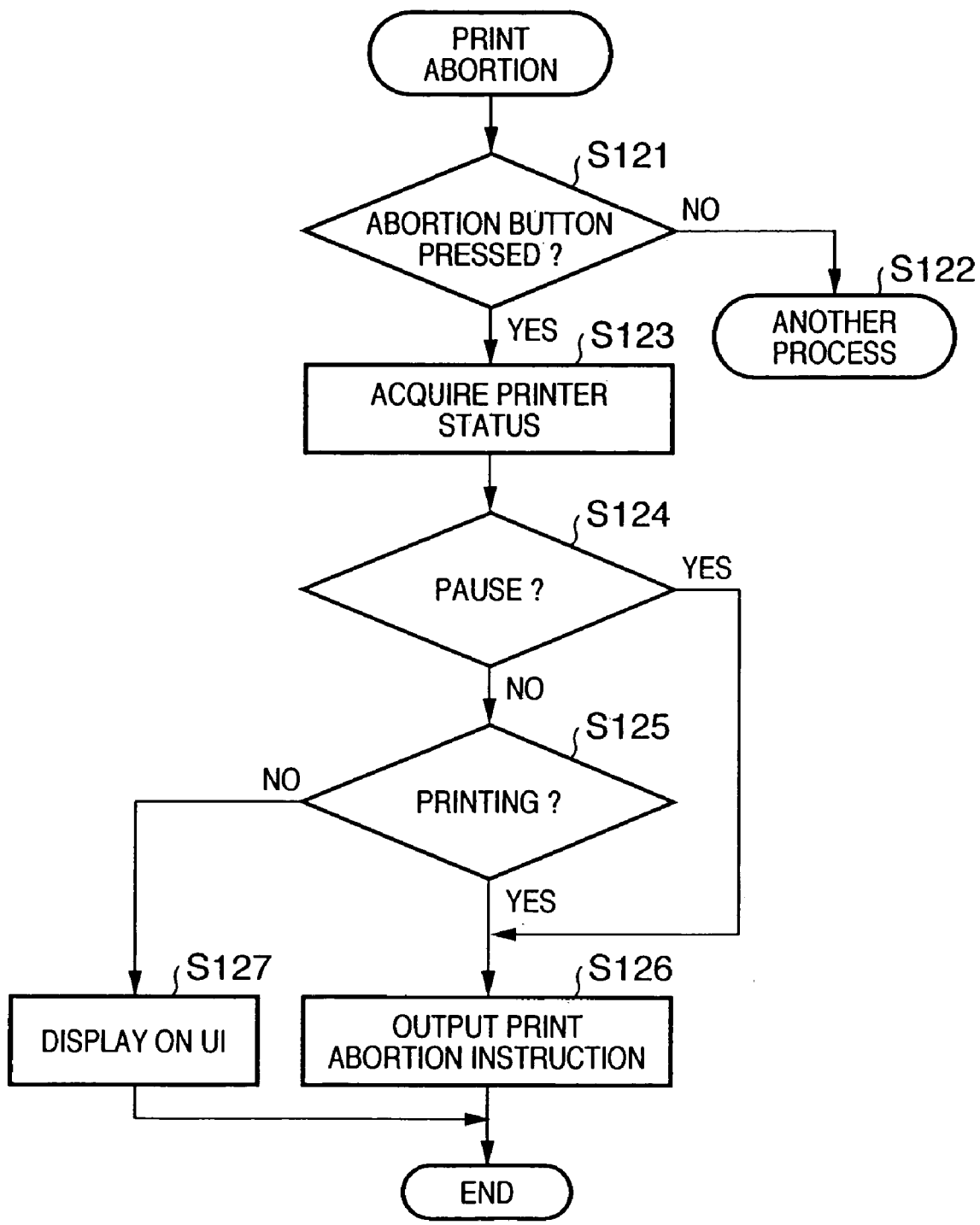
FIG. 12 is a flow chart for explaining a process accompanying button operation for aborting printing in the DSC according to the fourth embodiment.

FIG. 12 is a flow chart for explaining a print abortion process executed upon designating a print abortion button which designates abortion of a print process in the DSC 3012 according to the fourth embodiment.

In step S121, it is determined whether an abortion button among the operation buttons 3103 of the DSC 3012 has been designated. If NO in step S121, the process advances to step S122 to execute another process such as a process corresponding to a designated button or a wait for an instruction with a button. If the abortion button has been designated (pressed), the process advances to step S123. A "GetDeviceStatus" is issued to the PD printer 1000 to request current status information of the PD printer 1000 and acquire status information sent from the PD printer 1000 in response to the request. The process advances to step S124 to determine on the basis of the acquired status information whether the status of the PD printer 1000 is "pause". If YES in step S124, the process advances to step S126; if NO, to step S125 to determine whether print progresses. If YES in step S125, abortion of the print process is determined to be possible, and the process advances to step S126 to instruct the PD printer 1000 to abort the print process (transmit "AbortJob").

If NO in step S125, abortion of the print process is determined to be impossible, and a message to this effect is displayed on the UI of the display unit 2700. In this case, for example, a message is displayed on the display unit 2700 to notify the user that printing cannot be aborted, and/or selection of the abortion button is disabled. Wasteful press of the abortion button by the user can be avoided by acquiring the statue of the PD printer 1000 before pressing of the abortion button is determined in step S121, and notifying the user whether pressing of the abortion button is effective.

Fifth Embodiment

The above embodiments have mainly described processes in the DSC 3012. The fifth embodiment will explain a process when the PD printer 1000 acquires image data from the DSC 3012. The hardware arrangement in the fifth embodiment is the same as that in the above described embodiments, and a description thereof will be omitted.

Figure 13:
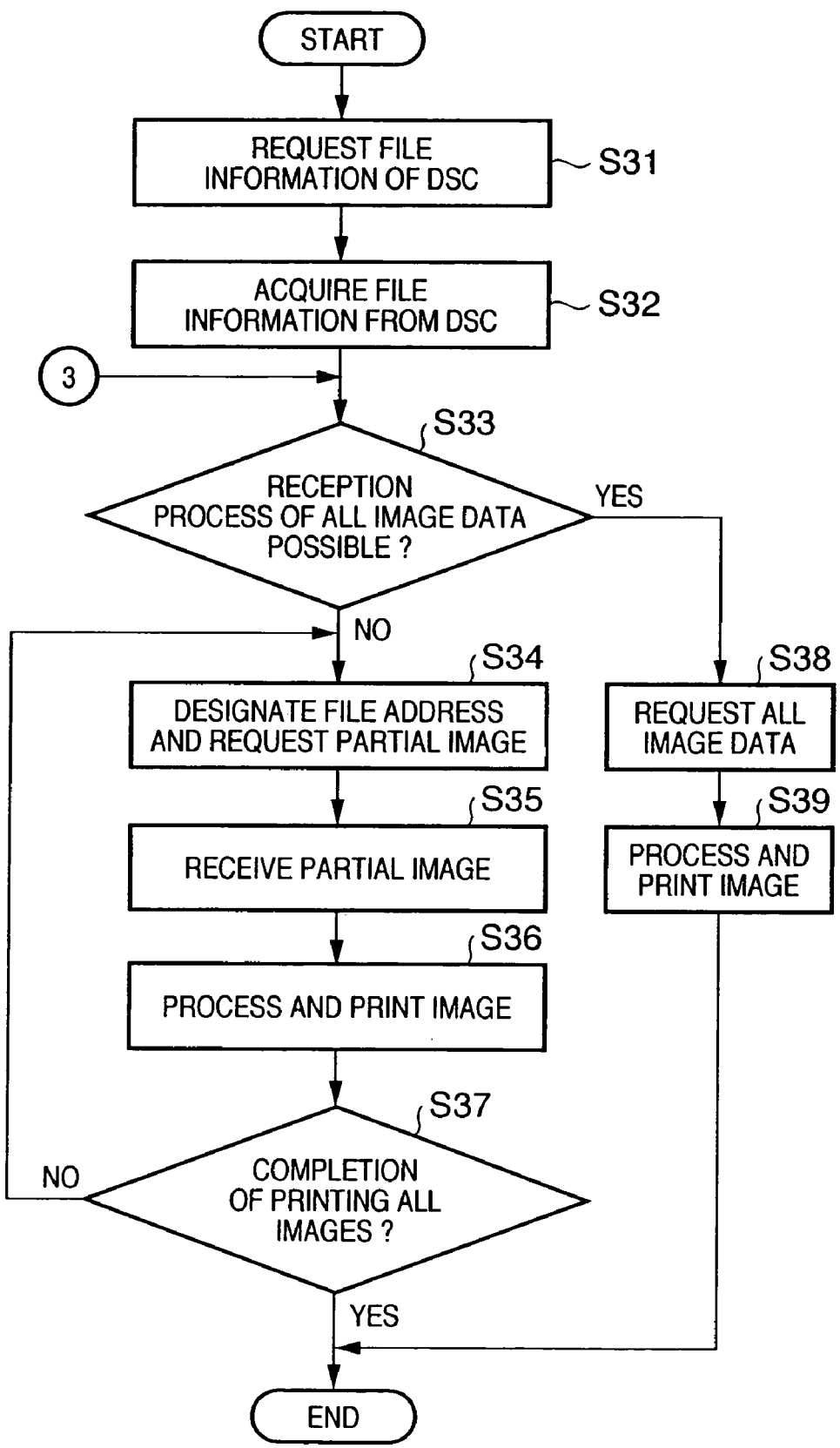
FIG. 13 is a flow chart for explaining a process by a PD printer according to the fifth embodiment.

FIG. 13 is a flow chart for explaining an image data acquisition process in the PD printer 1000 according to the fifth embodiment of the present invention. A program which executes this process is stored in the program memory 3003a, and executed under the control of the DSP 3002.

This process starts when a print request ("StartJob") is sent from the DSC 3012 to designate the start of a print process. In step S31, "GetFileInfo" is sent to the DSC 3012 to request information on an image file desired by the DSC 3012. In step S32, when information (file size, attribute, or the like) on the image file is sent from the DSC 3012, an item which is contained in the information and represents the file capacity is acquired. The process advances to step S33 to determine whether the entire image file can be received and processed at once. This is determined on the basis of, e.g., the memory capacity of a free area in the memory 3003 of the PD printer 1000. If reception of all image data at once is determined to be impossible, the process advances to step S34 to read out the image file. A start address and read amount are designated to request partial image data of the image file. This is performed using "GetPartialFile". The DSC 3012 reads out the designated partial image data from the image file in accordance with the start address and read amount, and transmits the partial image data to the PD printer 1000. The PD printer 1000 which has received the partial image data in step S35 processes and prints the partial image data in step S36. The process advances to step S37 to determine whether all image data of the image file have been printed. If NO in step S37, the process returns to step S34 to request the next partial image data. This process is repetitively executed until the entire image file designated in step S32 has been received and printed.

If it is determined in step S33 that image data of the image file can be received and processed at once, the process advances to step S38 to request all the data of the image file of the DSC 3012. In step S39, all the image data of the image file sent from the DSC 3012 on the basis of the request are received and printed.

Figure 14:
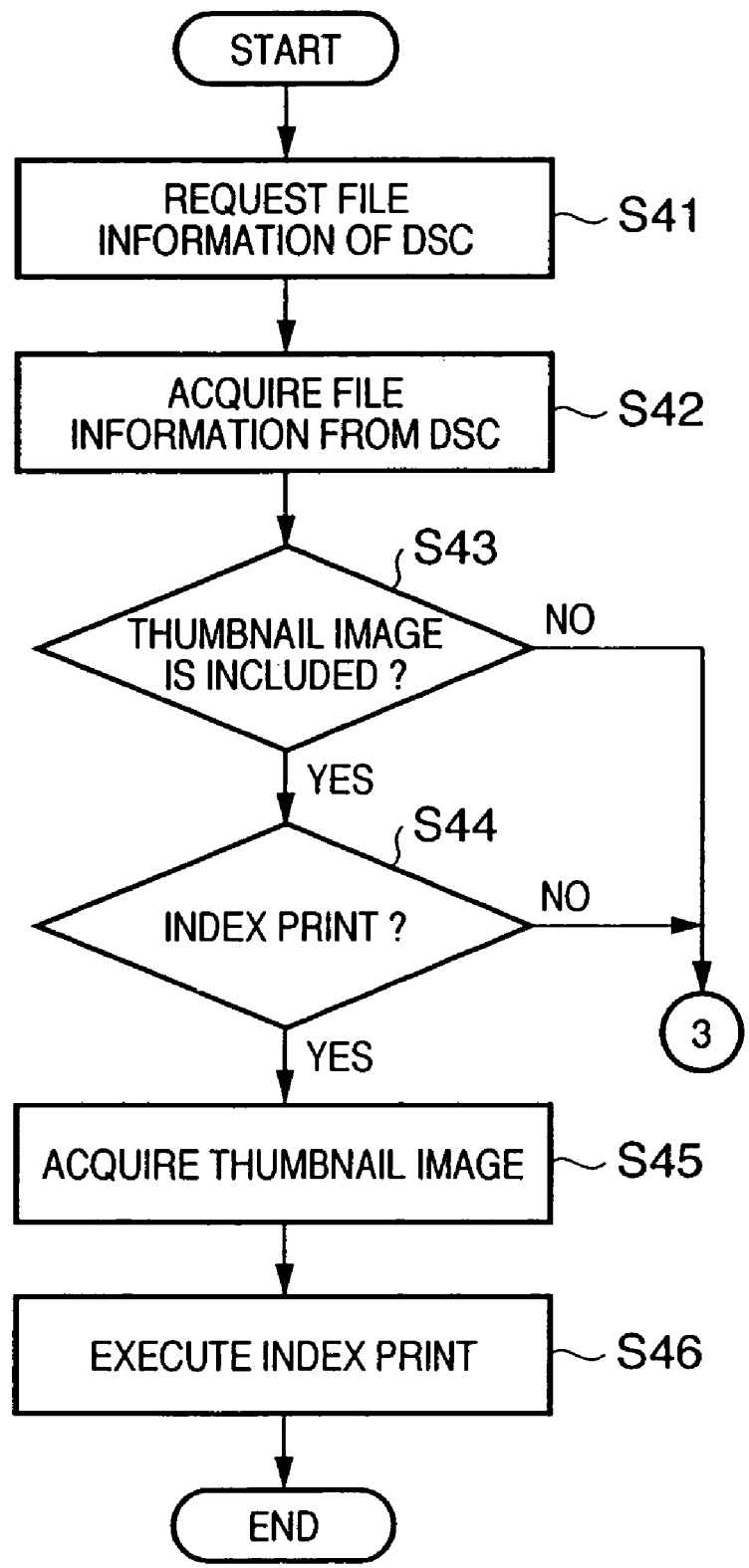
FIG. 14 is a flow chart for explaining another example of the image data acquisition process in the PD printer according to the fifth embodiment of the present invention.

FIG. 14 is a flow chart for explaining another example of the image data acquisition process in the PD printer 1000 according to the fifth embodiment of the present invention. A program which executes this process is stored in the program memory 3003a, and executed under the control of the DSP 3002.

This process starts when a print request ("StartJob") is sent from the DSC 3012 to designate the start of a print process. In step S41, "GetFileInfo" is sent to the DSC 3012 to request information on an image file designated by the DSC 3012. In step S42, if information on the image file is sent from the DSC 3012, the process advances to step S43 to determine whether the image file contains thumbnail images (index images). If the image file contains thumbnail images, the process advances to step S44 to determine whether index print is designated using the control unit 1010. If index print is designated, the process advances to step S45 to request the thumbnail image data of the DSC 3012 (issue "GetThumb") and acquire the data. The process advances to step S46 to execute index print on the basis of the acquired thumbnail image data.

If the image file does not contain any thumbnail image in step S43 or no index print is designated in step S44, the process advances to step S33 (FIG. 14) to execute the above-described image print process.

In this fashion, according to the fifth embodiment, the image data amount acquired at once from the DSC 3012 can be changed and input from the DSC 3012 in accordance with the memory capacity and process performance of the PD printer 1000.

It can be detected in advance that a thumbnail image has already been stored in the image file of the DSC 3012. When index print is designated in the PD printer 1000, a thumbnail image creation process in the PD printer 1000 can be omitted. Thus, a thumbnail image (index image) can be quickly printed.

Sixth Embodiment

Figure 15:
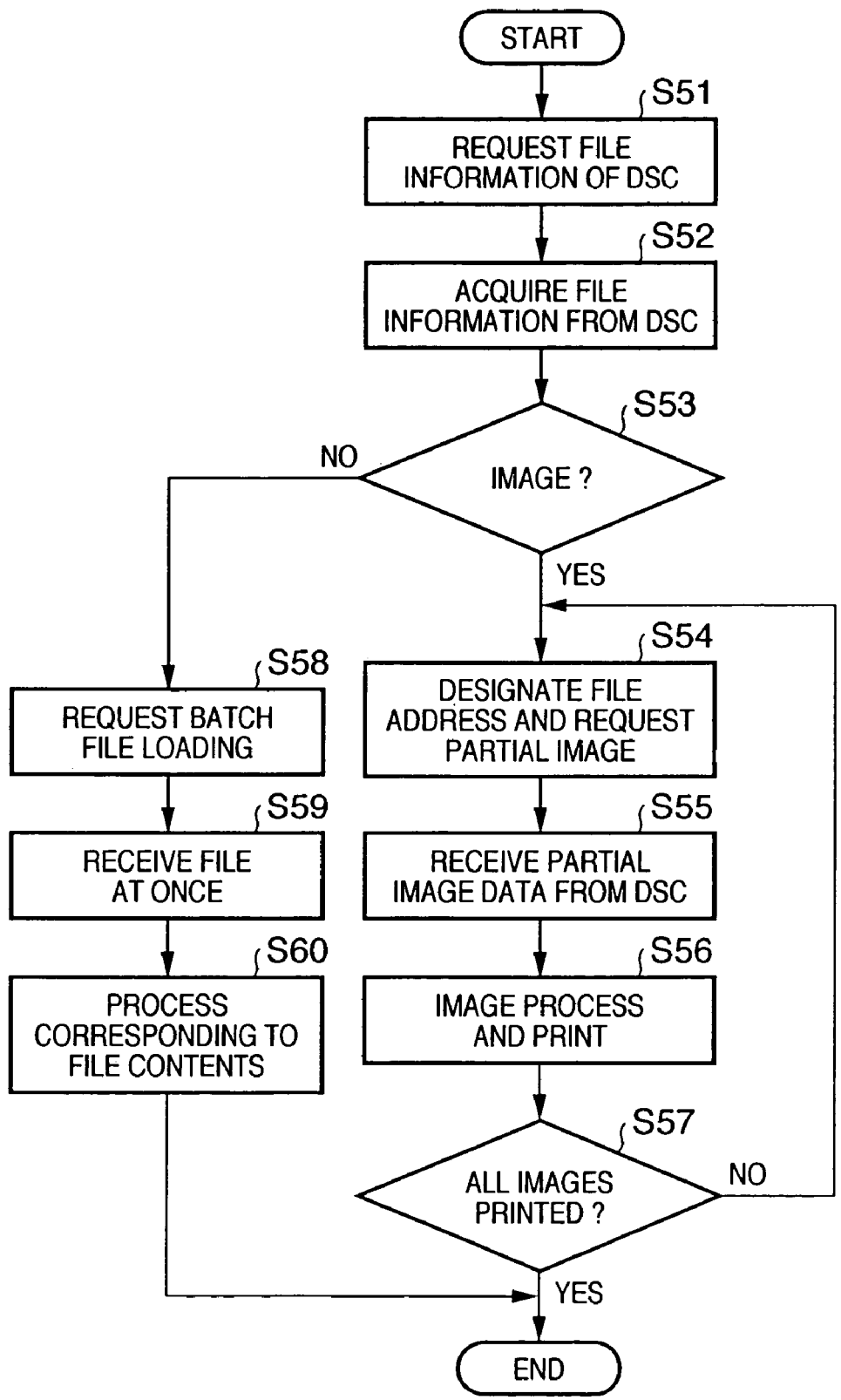
FIG. 15 is a flow chart for explaining an example of an image data acquisition method in the PD printer according to the sixth embodiment of the present invention.

FIG. 15 is a flow chart for explaining an example of an image data acquisition method in a PD printer 1000 according to the sixth embodiment of the present invention. An example of acquiring a file from the DSC 3012 by the PD printer 1000 in the system has been described in the above embodiments with reference to FIG. 6. That is, the PD printer 1000 acquires file information, and acquires a file in accordance with the file information. In the sixth embodiment, batch reception and partial reception of a file are switched using file attribute information.

The file attribute will be first explained.

In the sixth embodiment, as described above with reference to FIG. 7, a request issued from the DSC 3012 to the PD printer 1000 is transferred by a script file. The attribute of a file transferred from the DSC 3012 to the PD printer 1000 takes two types: a script file and image file. As for the image file, for example, a JPEG file which is used as a substantially standard image format in the DSC 3012 need not be loaded at once. The image file can be segmented and received in accordance with the free space of a memory for storing received image data in the PD printer 1000. An image process can be performed from the received image data part to continue and complete print.

However, as for the script file, the process may not proceed to the next process step unless the entire file is received at once and interpreted. When the file attribute represents a script file, the script file must be loaded at once, unlike an image file. In the sixth embodiment, therefore, file information is acquired, when the file is an image file, segmentation loading is performed, and when the file is a script file, batch loading is performed.

A script file is a file whose process cannot continue unless all items of information of the script are acquired at once, as described above. The PD printer 1000 according to the sixth embodiment must ensure a memory capacity sufficient to acquire an entire script file at once and store it. In the sixth embodiment, the upper limit of the file size of a script file sent from the DSC 3012 is determined in advance. The upper limit value is, e.g., 1 kbyte, and the PD printer 1000 is so designed as to always receive a script file of this size at once and store it.

According to the sixth embodiment, whether to load a file at once or segment and load it can be properly determined by determining the file attribute before the file is received from the DSC 3012. The file attribute is determined before file loading, the storage location in the memory can be changed in accordance with the attribute, and direct print can be quickly performed such that the next process is activated in parallel with file reception.

To acquire an image file, it is segmented and loaded. In segmentation loading according to the sixth embodiment, the maximum loading size of a partial file is determined in advance, and a partial file is loaded within the determined amount of data. When the total size of the file is equal to or smaller than the maximum loading size of a partial file, the entire file may be loaded at once even in segmentation loading.

In the sixth embodiment, files transferred from the DSC 3012 to the PD printer 1000 are only script and image files. This embodiment can also be applied to specifications in which a file of another attribute is exchanged. In a case where a file of an attribute represents that all items of information are necessary at once, all data of the file are loaded at once, similar to a script file in the sixth embodiment.

A process by the PD printer 1000 according to the sixth embodiment will be explained with reference to the flow chart of FIG. 15. A program which executes this process is stored in a program memory 3003a, and executed under the control of a CPU 3002.

This process starts when a print request ("StartJob") is sent from the DSC 3012 to designate the start of a print process. In step S51, "GetFileInfo" is sent to the DSC 3012 to request information on an image file desired by the DSC 3012. In step S52, when information (file size, attribute, or the like) on the image file is sent from the DSC 3012, information which is contained in the information and represents the file attribute is acquired. The process advances to step S53 to determine whether the file attribute represents an image. If the file attribute represents an image, the process advances to step S54 in order to acquire a segmented file. The file address is designated, and the partial image of the file is requested of the DSC 3012 by a "GetPartialFile" instruction. In step S55, partial image data transmitted from the DSC 3012 in response to the partial image request is acquired. In step S56, the acquired partial image data is processed, output to the printer engine 3004, and printed. In step S57, it is determined whether all images contained in the image file have been printed. If all images have not been printed, the process returns to step S54 to send a partial image request command to the DSC 3012 in order to acquire the next partial image.

If the file attribute does not represent an image in step S53, the process advances to step S58 to request batch loading of the file of the DSC 3012 by a "GetFile" instruction. The process advances to step S59 to receive a file (in this case, a script file) transmitted from the DSC 3012 in response to the batch loading request. In step S60, a process corresponding to the contents of the received file is executed and ends.

Seventh Embodiment

Figure 16:
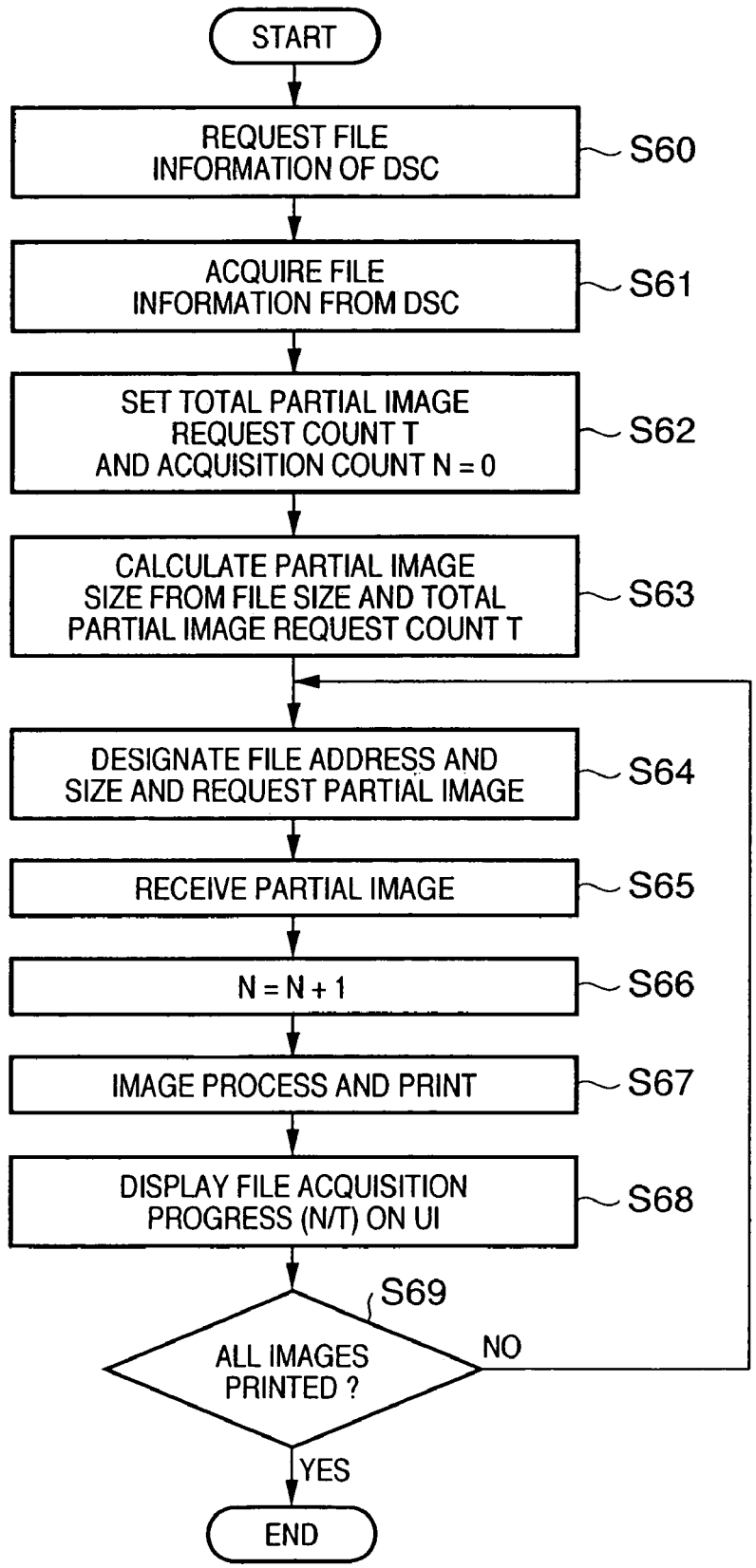
FIG. 16 is a flow chart for explaining an example of an image data acquisition method in a PD printer according to the seventh embodiment of the present invention.

FIG. 16 is a flow chart for explaining an example of an image data acquisition method in the PD printer 1000 according to the seventh embodiment of the present invention. An example of acquiring a file from the DSC 3012 by the PD printer 1000 in the system has been described in the above embodiments with reference to FIG. 6. That is, the printer acquires file information, and then acquires file contents in accordance with the file information.

The seventh embodiment uses size information representing a file size as file information, and uses a total partial image request count T and request count N for progress management. A method of acquiring partial images from an image file is set, and the progress of file acquisition is managed and displayed.

The PD printer 1000 requests file information of the DSC 3012 in step S60, and receives file information sent from the DSC 3012 as a response in step S61. The process advances to step S62 to set the total partial image request count T representing the total number of partial image requests for acquiring partial images. At the same time, the request count N representing the number of a currently acquired partial image is set to "0". The process advances to step S63 to calculate a file size to be requested by one partial image request from the file size information and total partial image request count T. In step S64, a start address for acquiring image data in a file and the data amount of the image data are designated on the basis of the file size, and partial image data is requested of the DSC 3012. Partial image data sent back from the DSC 3012 in response to the request is acquired. In step S66, a counter N for counting the partial image request count is incremented by only "1". In step S67, the partial image received in step S65 is processed and printed. In this case, if print cannot be done unless partial images of a predetermined amount are acquired, the print process is skipped until pintable image data have been acquired.

In step S68, the file acquisition progress (N/T) is displayed on the UI to present the progress to the user. In step S69, it is determined whether all images have been acquired and the image process and print process have been completed. If NO in step S69, the process advances to step S64 and continues; if YES, the process ends.

In this manner, the progress of acquiring partial images can be presented to the user.

(N/T) may be displayed in percentage. When T is set to the display area width (number of pixels) on the display unit 2700, the area width can be applied to progress display representing how far an image is displayed for each pixel. T and N are managed for each image, the total T and total N are displayed to the user, and the progress of a whole print job can be displayed.

As a modification, when a plurality of images are laid out on a page and printed, partial image acquisition can be preferably, efficiently managed using the same T even for images of different file sizes.

The timing at which the transfer progress is updated may be one at which the PD printer 1000 issues a partial image request, or one at which image data is received from the DSC 3012 in response to the request.

As another method of deciding the total partial image request count T in step S62, the count T may be decided on the basis of, e.g., T=S/M (S represents a file size) from a file size contained in file information acquired in step S61 and a memory capacity M capable of receiving a file at once and storing it by the PD printer 1000. The PD printer 1000 can more efficiently request and acquire partial image data.

In the above-described embodiments, a printer receives and processes image data from a digital camera serving as an image supply device. However, the present invention is not limited to this. Conceivable examples of the image supply device are a video camera, camera-equipped cell phone, various mobile devices, and image recording/playback apparatus. The receiving apparatus may be a communication apparatus such as a personal computer or facsimile apparatus, in addition to a printer.

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments (processes performed on the camera side and various print processes performed on the printer side) is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the present invention includes a case in which the functions of the above-described embodiments are realized when an OS (Operating System) or the like running on the computer performs part or all of actual processing on the basis of the instructions of the program codes.

As has been described above, according to the embodiments, when a print process in a printer is interrupted by disconnecting a cable which connects a DSC and the PD printer, and print can be restarted by connecting the cable again, the print process can be reliably restarted to print.

Image data resent from the DSC to the printer is changed at the restart of print between print based on a DPOF file and print of image data sequentially transmitted from the DSC to the printer. In either case, print can be reliably restarted.

When the DSC according to the embodiments issues a command such as StartJob or AbortJob to the printer, the DSC estimates that a predetermined state has been set even without any response from the printer, and can decide the next operation. The DSC further issues a command for confirming the status to the printer, and can identify the current state (status) of the printer.

When the PD printer sends back a specific status as a response to the DSC, the DSC performs a corresponding process. For example, for "NotExecuted" or "NotSupported", the DSC issues a command which inquires the state of the printer for the former command, and decides the next command to be issued on the basis of the response from the printer. For the latter command, a previously issued command is not supported by the printer, and thus the DSC executes a process of, e.g., changing a UI displayed on the display unit so as not to subsequently issue the same command. This can prevent resending of an unwanted command to the printer.

According to the embodiments, the image data amount acquired at once from the DSC can be adjusted in accordance with the memory capacity or process performance of the printer. Image data can be loaded, processed, and printed.

The present invention is not limited to the above embodiments and various changes and modifications can be made within the spirit and scope of the present invention. Therefore, to apprise the public of the scope of the present invention, the following claims are made.

What is claimed is:

1. A communication apparatus which receives data from an image supply device via a communication interface, comprising:

acquisition means for, upon reception of a data transmission request from the image supply device, acquiring information indicating the type of target data corresponding to the transmission request, wherein the data transmission request is issued by the image supply device when the image supply device has the target data to be transmitted to said communication apparatus;

decision means for deciding to segment the target data and receive the segmented target data a plurality of number of times from the image supply device in the case that the information indicates that the target data is image data, or to receive the target data at once from the image supply device in the case that the information indicates that the target data is script data; and segmentation process means for, in the case that the target data is image data, requesting partial data of the target data from the image supply device a plurality of number of times, and receiving and processing each partial data.

2. The apparatus according to claim 1, wherein the communication interface includes a USB, the image supply device includes a USB slave, and the communication apparatus includes a USB host.

3. The apparatus according to claim 1, wherein said segmentation process means presents progress of acquiring the partial data, on the basis of a total acquisition count of the partial data and an acquisition count of actually acquired partial data.

4. A communication control method in a communication apparatus which receives data from an image supply device via a communication interface, comprising:

an acquisition step of, upon reception of a data transmission request from the image supply device, acquiring information indicating the type of target data corresponding to the transmission request, wherein the data transmission request is issued by the image supply device when the image supply device has the target data to be transmitted to the communication apparatus;

a decision step of deciding to segment the target data and receive the segmented target data a plurality of number of times from the image supply device in the case that the information indicates that the target data is image data, or to receive the target data at once from the image supply device in the case that the information indicates that the target data is script data; and a segmentation process step of, in a case where the target data is image data, requesting partial data of the target data from the image supply device a plurality of number of times, and receiving and processing each data.

5. The method according to claim 4, wherein the communication interface includes a USB, the image supply device includes a USB slave, and the communication apparatus includes a USB host.

6. The method according to claim 4, wherein in said segmentation process step, progress of acquiring the partial data is presented on the basis of a total acquisition count of the partial data and an acquisition count of actually acquired partial data.

* * * * *